US010244087B2

(12) United States Patent
Dandra et al.

(10) Patent No.: US 10,244,087 B2
(45) Date of Patent: Mar. 26, 2019

(54) METHOD FOR HANDLING ATTACH REJECT MESSAGE WITH #14 CAUSE AT USER EQUIPMENT

(71) Applicant: Samsung Electronics Co., Ltd., Gyeonggi-do (KR)

(72) Inventors: Prasad Basavaraj Dandra, Bangalore (IN); Vijay Ganesh Surisetty, Bangalore (IN); Akshay Rastogi, Bangalore (IN); Srinivas Chinthalapudi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 146 days.

(21) Appl. No.: 15/198,525

(22) Filed: Jun. 30, 2016

(65) Prior Publication Data
US 2016/0316512 A1   Oct. 27, 2016

(30) Foreign Application Priority Data

Apr. 17, 2015   (IN) .................. 1998/CHE/2015(PS)
Apr. 12, 2016   (IN) .................. 1998/CHE/2015(CS)

(51) Int. Cl.
| | |
|---|---|
| *H04L 29/06* | (2006.01) |
| *H04W 76/18* | (2018.01) |
| *H04W 4/24* | (2018.01) |
| *H04M 15/00* | (2006.01) |
| *H04W 48/18* | (2009.01) |
| *H04W 76/02* | (2009.01) |
| *H04W 88/06* | (2009.01) |
| *H04W 8/22* | (2009.01) |

(52) U.S. Cl.
CPC .......... *H04L 69/28* (2013.01); *H04M 15/751* (2013.01); *H04M 15/8214* (2013.01); *H04W 4/24* (2013.01); *H04W 48/18* (2013.01); *H04W 76/027* (2013.01); *H04W 76/18* (2018.02); *H04M 2207/187* (2013.01); *H04W 8/22* (2013.01); *H04W 88/06* (2013.01)

(58) Field of Classification Search
CPC .... H04L 69/28; H04W 76/18; H04W 76/027; H04W 4/24; H04W 8/18; H04W 8/22; H04W 88/06; H04M 15/751; H04M 15/8214; H04M 2207/187
See application file for complete search history.

(56) References Cited

U.S. PATENT DOCUMENTS

| 8,706,111 B2 | 4/2014 | Cheng | |
|---|---|---|---|
| 2003/0119481 A1* | 6/2003 | Haverinen | ............ H04W 8/065 455/411 |

(Continued)

*Primary Examiner* — Jenee Holland
(74) *Attorney, Agent, or Firm* — The Farrell Law Firm, P.C.

(57) ABSTRACT

A method for handling an ATTACH reject message with packet radio service mobility management reject cause number (#14 cause) at a user equipment (UE) is provided. The method includes receiving, at the UE, an ATTACH accept message for a network service on a public land mobile network (PLMN) from a first network entity, wherein the PLMN is in a "forbidden PLMNs for general packet radio service (GPRS) service" list, detecting, by the UE, that the UE's evolved universal terrestrial radio access (E-UTRA) capability is disabled, and enabling, by the UE, the UE's E-UTRA capability and removing the PLMN from the "forbidden PLMNs for GPRS service" list.

14 Claims, 10 Drawing Sheets

(56) References Cited

U.S. PATENT DOCUMENTS

| | | | |
|---|---|---|---|
| 2005/0075129 A1* | 4/2005 | Kuchibhotla | H04W 48/18 455/552.1 |
| 2005/0180382 A1* | 8/2005 | Kim | H04W 48/18 370/349 |
| 2005/0227719 A1* | 10/2005 | Gunaratnam | H04W 48/18 455/510 |
| 2005/0227720 A1* | 10/2005 | Gunaratnam | H04W 48/18 455/510 |
| 2005/0254469 A1* | 11/2005 | Verma | H04W 36/0022 370/338 |
| 2006/0094427 A1* | 5/2006 | Buckley | H04W 48/16 455/434 |
| 2007/0265005 A1* | 11/2007 | Sitch | H04W 48/18 455/435.1 |
| 2008/0039086 A1* | 2/2008 | Gallagher | H04W 8/04 455/435.1 |
| 2008/0076420 A1* | 3/2008 | Khetawat | H04W 8/04 455/435.1 |
| 2008/0096607 A1* | 4/2008 | Lee | H04W 60/00 455/558 |
| 2008/0102896 A1* | 5/2008 | Wang | H04W 60/04 455/560 |
| 2009/0061877 A1* | 3/2009 | Gallagher | H04W 76/12 455/436 |
| 2009/0247160 A1* | 10/2009 | Muller | H04W 48/18 455/435.3 |
| 2009/0286542 A1* | 11/2009 | Roberts | H04W 48/18 455/436 |
| 2010/0113020 A1* | 5/2010 | Subramanian | H04W 48/18 455/435.2 |
| 2010/0203865 A1* | 8/2010 | Horn | H04W 48/16 455/411 |
| 2010/0216465 A1* | 8/2010 | Mubarek | H04W 48/18 455/435.1 |
| 2010/0267383 A1* | 10/2010 | Konstantinou | H04W 48/18 455/435.2 |
| 2011/0014913 A1* | 1/2011 | Yoon | H04W 48/20 455/435.3 |
| 2011/0117916 A1* | 5/2011 | Dahlen | H04W 48/02 455/436 |
| 2011/0194505 A1* | 8/2011 | Faccin | H04W 48/18 370/329 |
| 2011/0216732 A1* | 9/2011 | Maeda | H04W 4/08 370/329 |
| 2011/0249624 A1* | 10/2011 | Ramachandran | H04W 48/18 370/328 |
| 2011/0261787 A1* | 10/2011 | Bachmann | H04L 63/029 370/331 |
| 2012/0044867 A1* | 2/2012 | Faccin | H04W 60/00 370/328 |
| 2012/0044869 A1* | 2/2012 | Tiwari | H04W 48/18 370/328 |
| 2012/0071163 A1* | 3/2012 | Klingenbrunn | H04W 48/18 455/435.2 |
| 2012/0077456 A1* | 3/2012 | Tiwari | H04W 48/16 455/404.1 |
| 2012/0135730 A1* | 5/2012 | Rangaiah | H04W 48/20 455/434 |
| 2012/0171993 A1* | 7/2012 | Tiwari | H04W 48/02 455/410 |
| 2012/0178449 A1* | 7/2012 | Liao | H04W 60/00 455/435.2 |
| 2012/0178457 A1* | 7/2012 | Liao | H04W 76/18 455/437 |
| 2012/0202492 A1* | 8/2012 | Moisanen | H04W 60/00 455/435.1 |
| 2012/0224563 A1* | 9/2012 | Zisimopoulos | H04W 8/22 370/331 |
| 2012/0322504 A1* | 12/2012 | Chou | H04W 48/18 455/558 |
| 2013/0012216 A1* | 1/2013 | Chen | H04W 76/12 455/450 |
| 2013/0079006 A1* | 3/2013 | Cho | H04W 8/06 455/435.1 |
| 2013/0084855 A1* | 4/2013 | Ekici | H04W 48/18 455/432.1 |
| 2013/0183971 A1* | 7/2013 | Tamaki | H04W 36/0061 455/436 |
| 2013/0203411 A1* | 8/2013 | Cheng | H04W 48/18 455/435.1 |
| 2013/0250891 A1* | 9/2013 | Zhang | H04W 74/002 370/329 |
| 2013/0316699 A1* | 11/2013 | Jheng | H04W 48/18 455/423 |
| 2014/0141839 A1* | 5/2014 | Larsson | H04W 8/20 455/558 |
| 2014/0148169 A1* | 5/2014 | Li | H04W 36/0061 455/437 |
| 2014/0153408 A1* | 6/2014 | Jun | H04L 65/1066 370/250 |
| 2014/0355417 A1* | 12/2014 | Kim | H04W 24/04 370/221 |
| 2015/0117184 A1* | 4/2015 | Youtz | H04W 76/027 370/230 |
| 2015/0156692 A1* | 6/2015 | Kim | H04W 8/02 455/436 |
| 2015/0163659 A1* | 6/2015 | Tuli | H04W 48/02 370/328 |
| 2015/0245256 A1* | 8/2015 | Kiss | H04W 12/06 455/436 |
| 2015/0245258 A1* | 8/2015 | Kim | H04W 48/18 370/331 |
| 2015/0326612 A1* | 11/2015 | Faccin | H04W 48/16 726/1 |
| 2015/0327240 A1* | 11/2015 | Yamada | H04W 72/02 455/426.1 |
| 2016/0227396 A1* | 8/2016 | Lee | H04W 76/30 |
| 2017/0105150 A1* | 4/2017 | Olsson | H04W 36/0055 |

* cited by examiner

US 10,244,087 B2

METHOD FOR HANDLING ATTACH REJECT MESSAGE WITH #14 CAUSE AT USER EQUIPMENT

PRIORITY

This application claims priority under 35 U.S.C. § 119(a) to an Indian Complete Patent Application filed on Apr. 12, 2016 in the Indian Intellectual Property Office and assigned Serial No. 1998/CHE/2015 (CS) and an Indian Provisional Patent Application filed on Apr. 17, 2015 in the Indian Intellectual Property Office and assigned Serial No. 1998/CHE/2015 (PS), the entire content of each of which is incorporated herein by reference.

BACKGROUND

1. Field of the Disclosure

The present disclosure relates generally to a method of handling an ATTACH reject message at a user equipment (UE), and more particularly, to a method of handling an ATTACH reject message with #14 cause at the UE.

2. Description of the Related Art

Generally, a user equipment (UE) must register with a network to receive one or more services that require registration such as "Network Attachment." The UE triggers an ATTACH request to the network and the network either accepts or rejects the ATTACH request after checking whether all associated subscriptions are available for the services for which the UE is trying to register. If all of the associated subscriptions are available then the network replies with an ATTACH accept message, otherwise it replies with an ATTACH reject message and also indicates a cause for rejecting the service request from the UE. One such reject cause is general packet radio service (GPRS) mobility management (GMM) reject cause number 14 (e.g. #14) i.e., evolved packet system (EPS)/general packet radio services (GPRS) services not allowed in a public land mobile network (PLMN), which is used when the UE tries to register for packet switched (PS) services in the network but the UE is not subscribed to use the PS services in the network.

Further, the third generation partnership project (3GPP) system currently has two issues handling a reject cause #14 in a long term evolution (LTE) system, a second generation (2G) system, or a third generation (3G) system. The issues are as follows:

a) 3GPP specification 24.301 does not consider the scenario where an evolved universal terrestrial radio access (E-UTRA) is disabled due to reject cause #14 "No EPS services in this PLMN" and the GPRS services are enabled after manual selection of the PLMN.

b) 3GPP specification 24.008 does not consider the handling of reject cause #14 "No GPRS services in this PLMN" for the UEs using a subscriber identity module (SIM) type (which does not contain user preferred and operator preferred PLMN lists).

In a conventional system and method, as shown in FIG. 1A, when a UE is rejected with evolved packet system (EPS) mobility management (EMM) cause #14 "EPS services not allowed in this PLMN," the E-UTRA is disabled as per clause 4.5. 3GPP specification 24.301 discloses the following:

14 (EPS services not allowed in this PLMN)

The UE shall set the EPS update status to EU3 ROAMING NOT ALLOWED (and shall store it according to sub clause 5.1.3.3) and shall delete any Globally Unique Temporary Identifier (GUTI), last visited registered TAI and eKSI. Additionally, the UE shall reset the ATTACH Attempt counter and enter the state EMM-DEREGISTERED.PLMN-SEARCH. Further, the UE shall store the PLMN identity in the "forbidden PLMNs for GPRS service" list.

The UE operating in Circuit Switched (CS)/PS mode-1 or CS/PS mode-2 of operation which is already International Mobile Subscriber Identity (IMSI) attached for non-EPS services is still IMSI attached for the non-EPS services and shall set the update status to U2 NOT UPDATED.

The UE operating in the CS/PS mode-1 of operation and supporting A/Gb or Iu mode may select GSM EDGE Radio Access Network (GERAN) or Universal Terrestrial Radio Access Network (UTRAN) radio access technology and proceed with the appropriate Mobility Management (MM) specific procedure according to the MM service state. In this case, the UE shall disable the E-UTRA capability (see sub clause 4.5).

The UE operating in CS/PS mode-1 of operation and supporting A/Gb or Iu mode may perform a PLMN selection according to 3GPP TS 23.122 [6].

The UE operating in CS/PS mode-1 of operation and supporting S1 mode only, or operating in CS/PS mode-2 of operation shall delete the list of equivalent PLMNs and shall perform the PLMN selection according to 3GPP TS 23.122 [6].

If A/Gb mode or Iu mode is supported by the UE, the UE shall in addition handle the GMM parameters GMM state, GPRS update status, P-TMSI, P-TMSI signature, RAI, GPRS ciphering key sequence number and GPRS attach attempt counter as specified in 3GPP TS 24.008 [13] for the case when the combined attach procedure is rejected with the GMM cause with the same value.

Further, as per 3GPP specification 24.301, enabling of the EUTRA for this reject is possible only through power off/on or SIM/USIM removal. 3GPP specification 24.301 discloses the following:

4.5 Disabling and re-enabling of UE's E-UTRA capability

If the E-UTRA capability was disabled due to receipt of EMM cause #14 "EPS services not allowed in this PLMN", then the UE shall enable the E-UTRA capability when the UE powers off and powers on again or the USIM is removed.

Further, the 3GPP does not consider the issue below:

The User can manually select the #14 rejected PLMN, in such case UE has to try registration for PS services on this PLMN.

If GPRS/EPS service registration is accepted, PLMN gets removed from the "forbidden PLMNs for GPRS service" list but EUTRA still remains disabled which leads to no access to LTE.

This will cause problem to user as high data throughput, IMS, VoLTE feature available on LTE are not provided and UE will remain on legacy RATs.

In a conventional system and method, as shown in the FIG. 1B, the 3GPP specification does not consider #14 reject handling when the UE is using the SIM/USIM that does not contain the files "User Controlled PLMN Selector with Access Technology," "Operator Controlled PLMN Selector with Access Technology," but only contains the "PLMN Selector" data file. 3GPP specification 24.008 discloses the following:

14 (GPRS services not allowed in this PLMN)
  The UE shall delete any RAI, P-TMSI, P-TMSI signature, and GPRS ciphering key sequence number stored, shall set the GPRS update status to GU3 ROAMING NOT ALLOWED (and shall store it according to sub clause 4.1.3.2), shall reset the GPRS attach attempt counter and shall change to state the GMM-DEREGISTERED.
  The UE shall store the PLMN identity in the "forbidden PLMNs for GPRS service" list.
  As an implementation option, a GPRS UE operating in operation mode A or B may perform the PLMN selection according to 3GPP TS 23.122 [14].
  If the UE in GAN mode performs the PLMN selection, it shall request the PLMN list in the GAN (see 3GPP TS 44.318 [76b]) prior to performing the PLMN selection from this list according to 3GPP TS 23.122 [14].
  The UE shall not perform the optional PLMN selection in the case where the PLMN providing this reject cause is:
  On the "User Controlled PLMN Selector with Access Technology" or,
  On the "Operator Controlled PLMN Selector with Access Technology" list or,
  The PLMN identified as equivalent to any PLMN, within the same country, contained in the lists above.

Further, when #14 reject is encountered on the PLMN present in a "PLMN Selector" data file, a UE will perform the PLMN selection causing a CS paging miss, data stall, and no service issues. The UE may come back to the same PLMN after traversing the complete available PLMN list and attempting to register each one in the PLMN list.

In a conventional system and method, as shown in the FIG. 1C, the 3GPP specification does not consider #14 reject cause handling when a UE is using a SIM/USIM that contains "User Controlled PLMN Selector with Access Technology" and "Operator Controlled PLMN Selector with Access Technology" data files with the corresponding access technology not being part of the operating mode. 3GPP specification 24.008 discloses the following:

14 (GPRS services not allowed in this PLMN)
  The UE shall delete any RAI, P-TMSI, P-TMSI signature, and GPRS ciphering key sequence number stored, shall set the GPRS update status to GU3 ROAMING NOT ALLOWED (and shall store it according to sub clause 4.1.3.2), shall reset the GPRS attach attempt counter and shall change to state GMM-DEREGISTERED.
  The UE shall store the PLMN identity in the "forbidden PLMNs for GPRS service" list.
  As an implementation option, the GPRS UE operating in operation mode A or B may perform the PLMN selection according to 3GPP TS 23.122 [14].
  If the UE in the GAN mode performs the PLMN selection, it shall request the PLMN list in the GAN (see 3GPP TS 44.318 [76b]) prior to performing the PLMN selection from this list according to 3GPP TS 23.122 [14].
  The UE shall not perform the optional PLMN selection in the case where the PLMN providing this reject cause is:
  On the "User Controlled PLMN Selector with Access Technology" or,
  On the "Operator Controlled PLMN Selector with Access Technology" list or,
  A PLMN identified as equivalent to any PLMN, within the same country, contained in the lists above.

Further, when a #14 rejection is encountered on a PLMN available in a selector list, and an SIM/universal SIM (USIM) contains a "User Preferred PLMN" list and "Operator preferred PLMN" list, but its access technology is not part of a UE's radio access technology (RAT) mode. For example, if a UE is operating in an LTE-Universal Mobile Telecommunications System (UMTS) mode, but the SIM/USIM has a "User Preferred PLMN" list and an "Operator preferred PLMN" list with global system for mobile communications (GSM) access technology only. In this case, the UE will perform the PLMN selection causing a circuit switched (CS) paging miss, a data stall, and no service issues. The UE may come back to the same PLMN after traversing the complete available PLMN list and attempting to register each one in the PLMN list.

SUMMARY

An aspect of the present disclosure provides a mechanism for handling an ATTACH reject message with #14 cause at a UE.

Another aspect of the present disclosure provides a mechanism for receiving, at a UE, an ATTACH accept message for a network service on a PLMN from a first network entity, wherein the PLMN is in a "Forbidden PLMNs for General Packet Radio Service (GPRS) service" list.

Another aspect of the present disclosure provides a mechanism for detecting, by a UE, that the UE's E-UTRA capability is disabled.

Another aspect of the present disclosure provides a mechanism for enabling, by a UE, the UE's E-UTRA capability and removing a PLMN from a "Forbidden PLMNs for GPRS service" list.

Another aspect of the present disclosure provides a mechanism for sending, by a UE, an ATTACH request message for a CS service and a PS service on a PLMN to a network entity, where the PLMN is in a "Selector PLMN" list.

Another aspect of the present disclosure provides a mechanism for receiving, by a UE, an ATTACH reject message with #14 cause from a network entity, where the ATTACH reject message with #14 cause indicates that a PS service is not supported by the network entity.

Another aspect of the present disclosure provides a mechanism for remaining, by a UE, camped on a network entity for a CS service and blocking a PLMN selection from a "Selector PLMN" list.

In accordance with an aspect of the present disclosure, a method for handling an ATTACH reject message with packet radio service mobility management reject cause number (#14 cause) at a user equipment (UE) is provided. The method includes receiving, at the UE, an ATTACH accept message for a network service on a public land mobile network (PLMN) from a first network entity, wherein the PLMN is in a "forbidden PLMNs for general packet radio service (GPRS) service" list, detecting, by the UE, that the UE's evolved universal terrestrial radio access (E-UTRA) capability is disabled, and enabling, by the UE, the UE's E-UTRA capability and removing the PLMN from the "forbidden PLMNs for GPRS service" list.

In accordance with another aspect of the present disclosure, a method for handling an ATTACH reject message with #14 cause at a UE is provided. The method includes sending, by the UE, an ATTACH request message for a circuit switched (CS) service and a packet switched (PS) service on a PLMN to a network entity, wherein the PLMN is in a "selector PLMN" list; receiving, by the UE, an ATTACH reject message with #14 cause from the network entity; and remaining, by the UE, camped on the network entity for the CS service and blocking PLMN selection.

In accordance with another aspect of the present disclosure, a UE for handling an ATTACH reject message with #14 cause is provided. The UE includes a controller configured to receive an ATTACH accept message for a network service on a PLMN from a first network entity, wherein the PLMN is in a "forbidden PLMNs for GPRS service" list; detect that the UE's E-UTRA capability is disabled; and enable the UE's E-UTRA capability and remove the PLMN from the "forbidden PLMNs for GPRS service" list.

In accordance with another aspect of the present disclosure, a UE for handling an ATTACH reject message with #14 cause is provided. The UE includes a controller configured to send an ATTACH request message for a CS service and a PS service on a PLMN to a network entity, wherein the PLMN is in a "selector PLMN" list; receive an ATTACH reject message with #14 cause from the network entity; and remain camped on the network entity for the CS service and block PLMN selection.

In accordance with another aspect of the present disclosure, a non-transitory computer-readable storage medium having recorded thereon a computer program for executing a method is provided. The method includes receiving, at a UE, an ATTACH accept message for a network service on a PLMN from a first network entity, wherein the PLMN is in a "forbidden PLMNs for GPRS" list; detecting, by the UE, that the UE's E-UTRA capability is disabled; and enabling, by the UE, the UE's E-UTRA capability and removing the PLMN from the "forbidden PLMNs for GPRS service" list.

In accordance with another aspect of the present disclosure, a non-transitory computer-readable storage medium having recorded thereon a computer program for executing a method is provided. The method includes sending, by a UE, an ATTACH request message for a CS service and a PS service on a PLMN to a network entity, wherein the PLMN is in a "selector PLMN" list; receiving, by the UE, an ATTACH reject message with #14 cause from the network entity; and remaining, by the UE, camped on the network entity for the CS service and blocking PLMN selection.

In accordance with another aspect of the present disclosure, a method for handling an ATTACH reject message with #14 cause at a UE is provided. The method includes receiving, at the UE, an ATTACH accept message for a network service on a Public Land Mobile Network (PLMN) from a first network entity, wherein the PLMN is in a "Forbidden PLMNs for General Packet Radio Service (GPRS) service" list. Further, the method includes detecting UE's Evolved Universal Terrestrial Radio Access (E-UTRA) capability is disabled. Further, the method includes enabling, by the UE, the UE's E-UTRA capability and removing the PLMN from the "Forbidden PLMNs for GPRS service" list.

In accordance with another aspect of the present disclosure, a method for handling an ATTACH reject message with #14 cause at a UE is provided. The method includes sending, by the UE, an ATTACH request message for a Circuit Switched (CS) service and a Packet Switched (PS) service on a Public Land Mobile Network (PLMN) to a network entity, wherein the PLMN is in a "Selector PLMN List." Further, the method includes receiving, by the UE, an ATTACH reject message with #14 cause from the network entity, wherein the ATTACH reject message with #14 cause indicates that the PS service is not supported by the network entity. Further, the method includes remaining, by the UE, camped on the network entity for the CS service and blocking PLMN selection from the "Selector PLMN List."

BRIEF DESCRIPTION OF THE DRAWINGS

This above and other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1A:
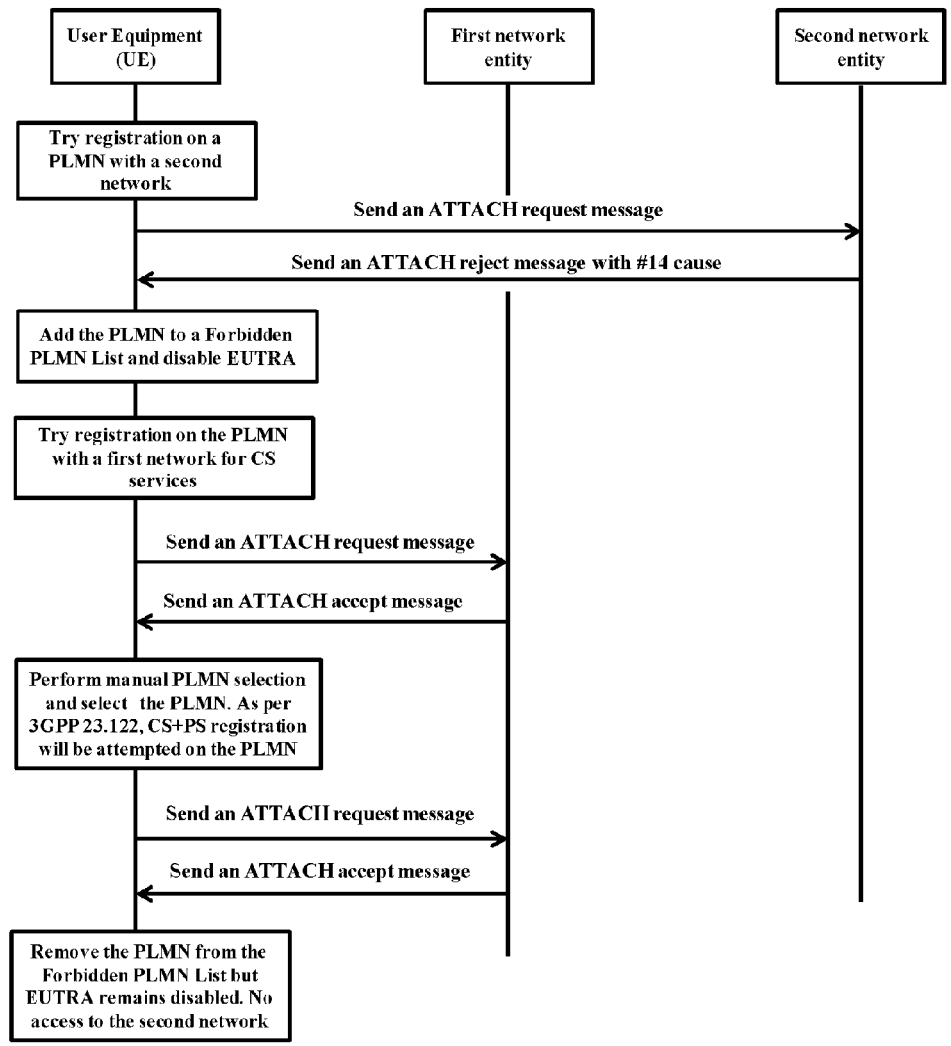
FIGS. 1A-1C is a sequence diagram for handling an ATTACH reject message with #14 cause at a UE, according to the related art.
Figure 1B:
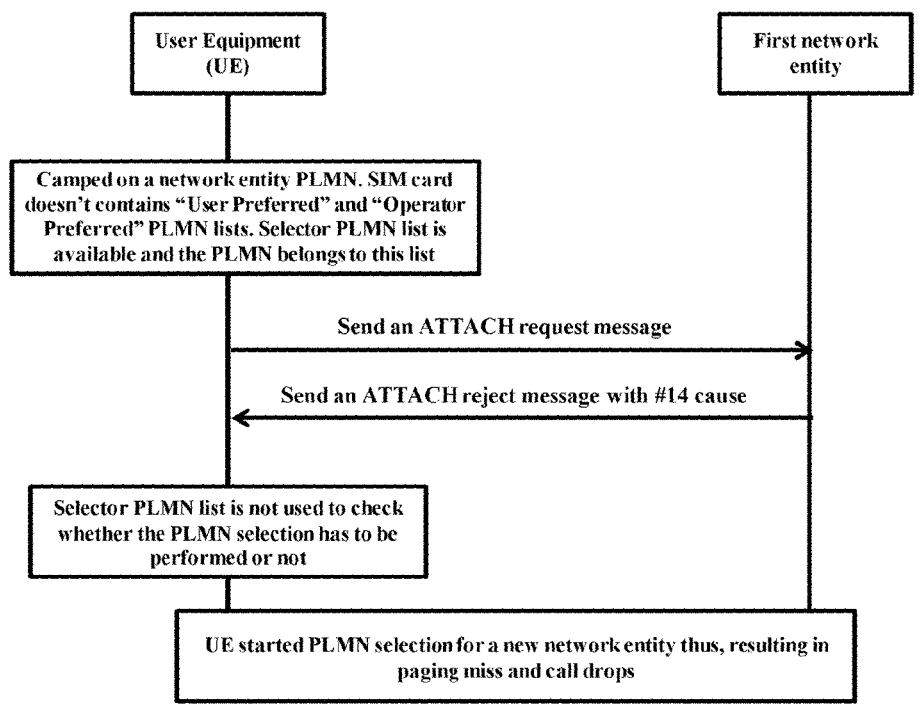
Figure 1C:
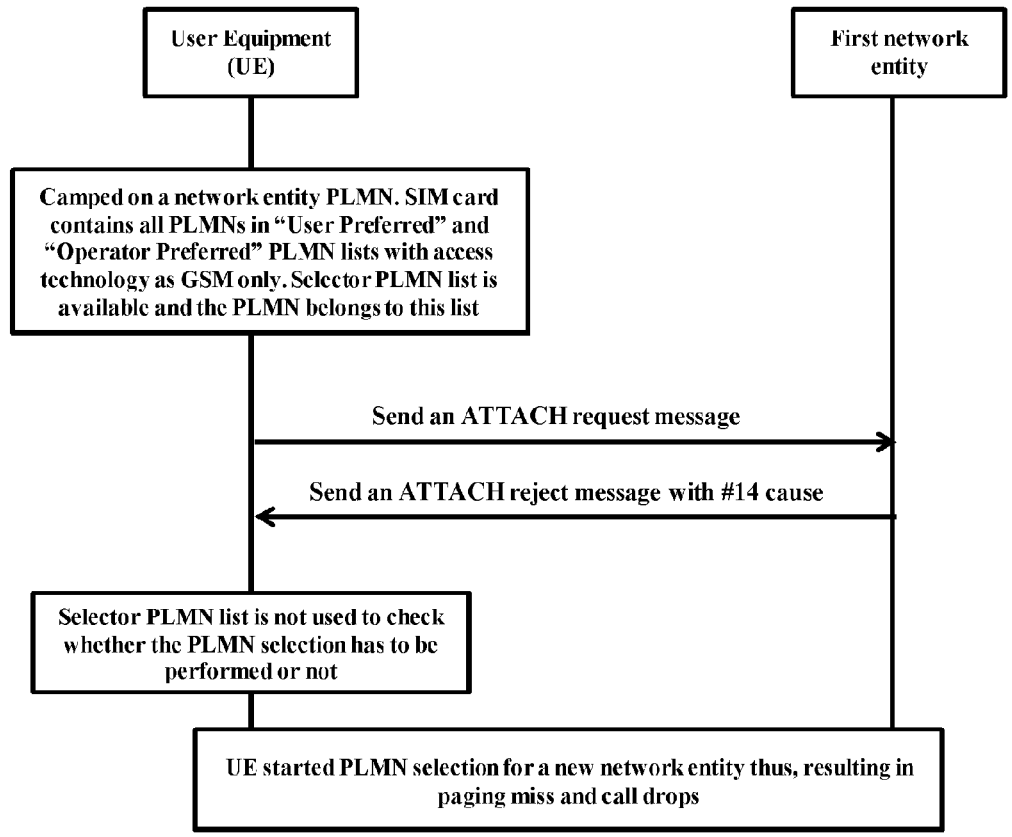

The embodiments of the present disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples are not intended to be construed as limiting the scope of the present disclosure as defined by the appended claims and their equivalents.

The embodiments of the present disclosure each provide a method for handling an ATTACH reject message with #14 cause at a UE. The method includes receiving an ATTACH accept message for a network service on a PLMN from a first network entity, wherein the PLMN is in a "Forbidden PLMNs for GPRS service" list. Further, the method includes detecting that a UE's E-UTRA capability is disabled. Further, the method includes enabling the UE's E-UTRA capability and removing the PLMN from the "Forbidden PLMNs for GPRS service" list.

In an embodiment of the present disclosure, an ATTACH accept message for a network service on a PLMN from a first network entity is received when a manual PLMN selection is triggered at a UE or a non-access stratum (NAS) timer (e.g. timer T3245) expires thereby modifying the contents of the "Forbidden PLMNs for GPRS service" list.

In an embodiment of the present disclosure, wherein receiving an ATTACH accept message for a network service on a PLMN from a first network entity includes sending an ATTACH request message to the first network for the network service on the PLMN. Further, the method includes receiving the ATTACH accept message from the first network entity.

In an embodiment of the present disclosure, a PLMN is added in a "Forbidden PLMNs for GPRS service" list and a corresponding UE's E-UTRA is disabled in response to receiving an ATTACH reject message with #14 cause from a second network entity.

In an embodiment of the present disclosure a method for handling an ATTACH reject message with #14 cause at a UE is provided. The method includes sending an ATTACH request message for a CS service and a PS service on a PLMN to a network entity, where the PLMN is in a "Selector PLMN List." Further, the method includes receiving the ATTACH reject message with #14 cause from the network entity, wherein the ATTACH reject message with #14 cause indicates that the PS service is not supported by the network entity. Further, the method includes remaining camped on the network entity for the CS service and blocking PLMN selection from the "Selector PLMN List."

Unlike conventional systems and methods, the present disclosure provides a robust and simple mechanism for managing "No General Packet Radio Service (GPRS)/Evolved Packet System (EPS) Service" in a PLMN reject cause. Further, in the of the present disclosure, access to LTE network (i.e., a first network entity) is enabled when a network service is accepted through manual selection of a PLMN in a "Forbidden PLMNs for GPRS service" list, thus, avoiding no service and CS paging miss issues, and improving user experience by providing uninterrupted service. In the present disclosure, when manual network selection mode is selected or when a timer (e.g. "T3245") expires, which was initiated when the PLMN was added to the "Forbidden PLMNs for GPRS service" list and the UE successfully registers in the PLMN available in the "Forbidden PLMNs for GPRS service" list, an E-UTRA is enabled.

In an embodiment of the present disclosure, a UE blocks a PLMN selection when a "User Preferred PLMN List" and an "Operator PLMN List" are available in a SIM of the UE, wherein the PLMN in the "User Preferred PLMN List" and the "Operator PLMN List" are available in a SIM supporting an access network different than an access network currently associated with the UE.

In an embodiment of the present disclosure, a UE blocks a PLMN selection when a "User Preferred PLMN List" and an "Operator PLMN List" are unavailable in a SIM of the UE.

Unlike conventional systems and methods, an optional PLMN selection procedure is not performed if #14 reject "No GPRS services in this PLMN" is received on a UMTS or GSMRAT with a PLMN belonging to the "Selector PLMN List," and a SIM or a USIM issued without access technology storage (i.e., the "User Controller PLMN Selector with Access Technology" and the "Operator Controlled PLMN Selector with Access Technology" data files are not available). Further, the "Selector PLMN List" from the SIM or the USIM may be used when all the PLMNs in a user controller and the Operator Controller PLMN selector list does not support the access technology that the UE is currently operated.

An embodiment of the present disclosure enhances the behaviour of a UE for a better user experience by providing new ways to manage the UE operations when reject cause #14 is encountered by the UE. Further, the present disclosure provides that for the UE whose E-UTRA is disabled due to reception of #14 reject received on an LTE access technology, if a user performs a manual PLMN selection of the same PLMN or a NAS timer (e.g. T3245) expires thereby modifying the contents of "forbidden PLMNs for GPRS service" list and the PS registration is successful, the E-UTRA is enabled. This enhances the user experience as the user with the LTE subscription will be able to provide the faster data rates and enhanced services of the LTE.

The present disclosure addresses UE behaviour when reject cause #14 is encountered by the UE on a 2G or a 3G access technology which is using a SIM card. Conventional mechanisms force the UE (using a SIM card) which is camped on a PLMN listed in a "Selector PLMN List" data file, in the fore mentioned condition to trigger a PLMN selection. Further, triggering of the PLMN selection is not required as the UE may come back to the same PLMN (since it is listed in the "Selector PLMN List" data file) after PLMN selection. This may waste the UE's time and resources leading to missed calls (i.e., a paging miss) and battery drain. In the present disclosure, when #14 reject cause is received on the PLMN listed in "Selector PLMN List" data file, the PLMN selection is not performed thus saving valuable UE resources and reducing the paging miss events.

Referring to the accompanying drawings, and more particularly to FIGS. 2A through 6, similar reference characters denote corresponding features consistently throughout the figures.

Figure 2A:
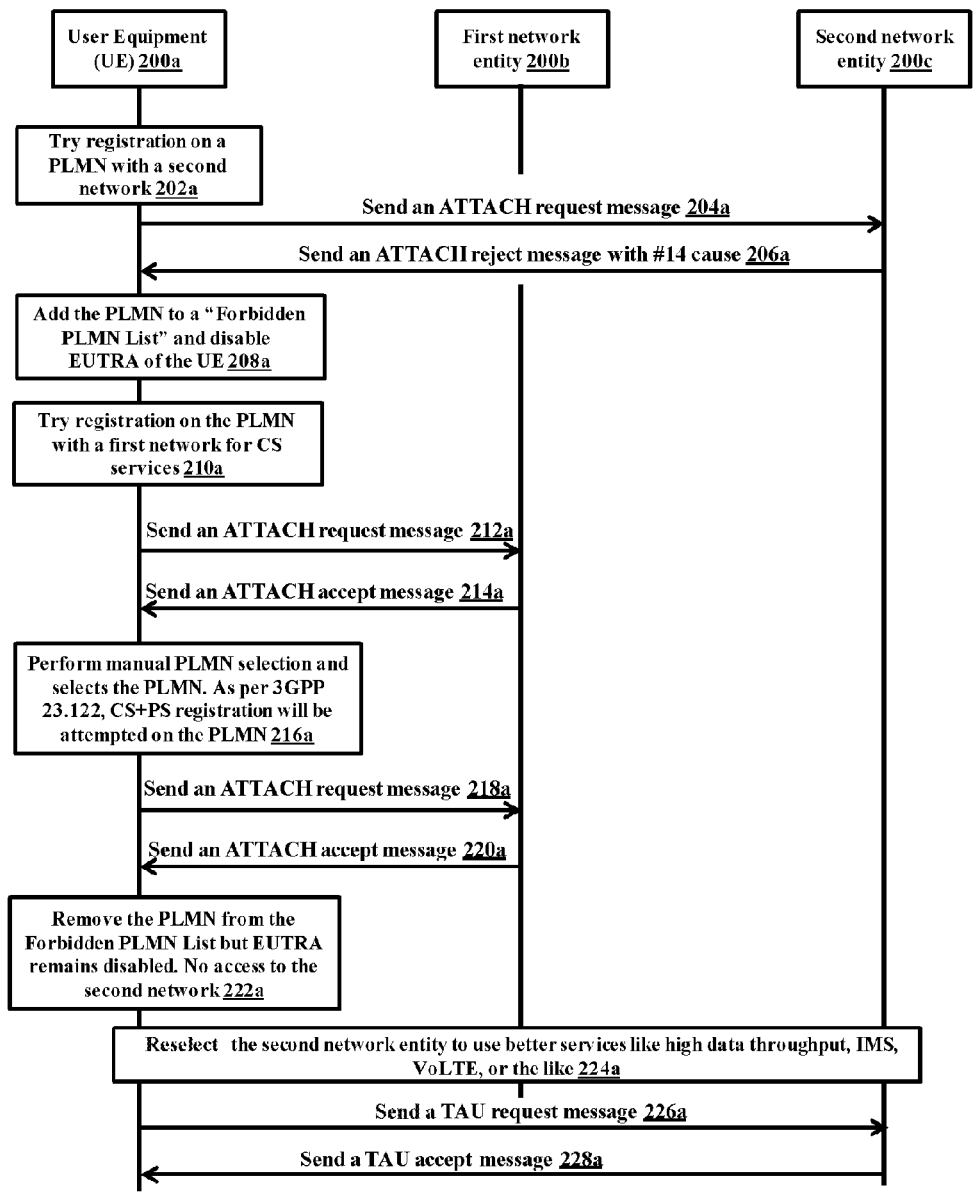
FIG. 2A is a sequence diagram for handling an ATTACH reject message with #14 cause by enabling a E-UTRA of a UE, according to an embodiment of the present disclosure.

FIG. 2A is a sequence diagram for handling an ATTACH reject message with #14 cause by enabling an E-UTRA of the UE, according to an embodiment of the present disclosure.

Referring to FIG. 2A, the signaling sequence depicts communication between a UE 200a, a first network entity 200b, and a second network entity 200c. The UE 200a may be, for example, a laptop, a desktop computer, a mobile phone, a smart phone, personal digital assistant (PDA), a tablet, a phablet, or the like. The first network entity 200b may be a UMTS network. The first network entity 200b may be a GSM network. The second network entity 200c may be an LTE network.

At step 202a, initially, the UE 200a attempts to register on a PLMN with the second network entity 200c.

At step 204a, the UE 200a sends an ATTACH request (i.e., ATTACH_REQUEST) message to the second network entity 200c.

At step 206a, after receiving the ATTACH request message, the second network entity 200c sends an ATTACH reject (i.e., ATTACH REJECT) message with #14 cause to the UE 200a.

At step 208a, after receiving the ATTACH reject message with #14 cause, the UE 20 adds the PLMN to a "Forbidden PLMNs for GPRS service" list and an E-UTRA of the UE 200a is disabled.

At step 210a, after adding the PLMN to the "Forbidden PLMNs for GPRS service" list, the UE 200a attempts to register on the same PLMN with the first network entity 200b for a CS service.

At step 212a, the UE 200a sends an ATTACH request message for the CS service to the first network entity 200b.

At step 214a, after receiving the ATTACH request message, the first network entity 200b sends an ATTACH accept (i.e., ATTACH_ACCEPT) message to the UE 200a.

At step 216a, after receiving the ATTACH accept message, the UE 200a performs a manual PLMN selection and selects the PLMN. As per 3GPP specification 23.122, the UE 200a attempts to register on the PLMN for the CS service and a PS service with the first network entity 200b.

At step 218a, the UE 200a sends an ATTACH request message to the first network entity 200b for the network service (i.e., CS service and the PS service) on the PLMN to the first network entity 200b.

At step 220a, after receiving the ATTACH request message, the first network entity 200b may be configured to send an ATTACH accept message for the network service on the PLMN to the UE 200a. The PLMN is in the "Forbidden PLMNs for GPRS service" list, and the E-UTRA capability of the UE 200a is disabled.

At step 222a, after receiving the ATTACH request message, the UE 200a may be configured to enable the E-UTRA capability and remove the PLMN from the "Forbidden PLMNs for GPRS service" list.

At step 224a, after enabling the E-UTRA capability of the UE 200a, the UE 200a reselects the second network entity 200c to use better network services such as high data throughput, internet protocol multimedia subsystem (IMS), voice over LTE (VoLTE), or the like.

At step 226a, the UE 200a sends a tracking area update (TAU) request message to the second network entity 200c.

At step 228a, after receiving the TAU request message, the second network entity 200c sends a TAU accept message to the UE 200a.

Unlike conventional systems and methods, when the GPRS/EPS (i.e., PS services) are accepted by the first network entity 200a as a result of manual selection on the PLMN in the "Forbidden PLMNs for GPRS service" list, then the E-UTRA capability of the UE 200a is enabled, thus, facilitating the UE 200a to access the second network entity 200c (i.e., an LTE network where high data throughput, the IMS, the VoLTE, or like services are provided).

The steps in the sequence diagram in FIG. 2A may be performed in the order presented, in a different order or simultaneously. Further, in an embodiment of the present disclosure, some of the steps may be omitted, added, modified, skipped, or the like without departing from the scope and spirit of the present disclosure.

Figure 2B:
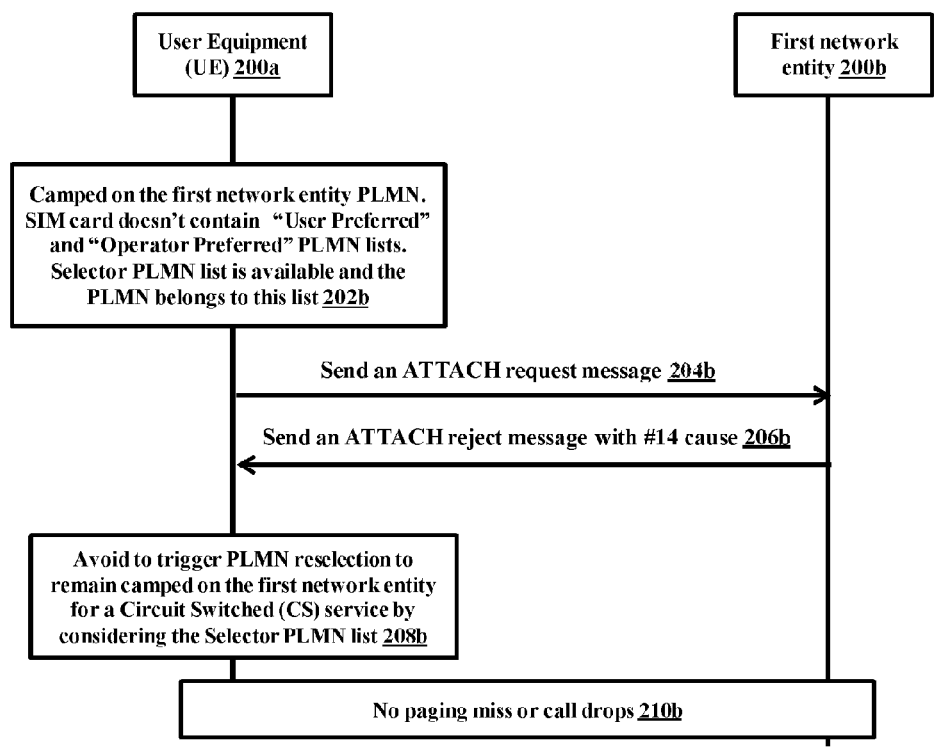
FIG. 2B is a sequence diagram for handling an ATTACH reject message with #14 cause to remain camped on a network entity for a CS service, according to an embodiment of the present disclosure.

FIG. 2B is a sequence diagram for handling an ATTACH reject message with #14 cause to remain camped on a network entity for the CS service, according to an embodiment of the present disclosure.

Referring to FIG. 2B, the signaling sequence depicts communication between the UE 200a, and the first network entity 200b (i.e., a network entity). The first network entity 200b may be a UMTS network. The first network entity 200b may also be a GSM network.

At step 202b, initially, the UE 200a is camped on the PLMN of the first network entity 200b. A SIM card in the UE 200a does not contain "User Preferred" and "Operator Preferred" PLMN lists. Further, the SIM card includes a "Selector PLMN List" and the PLMN is in the "Selector PLMN List."

At step 204b, the UE 200a can be configured to send an ATTACH request message for the network service (i.e., the CS service and the PS service) on the PLMN to the first network entity 200b, where the PLMN is in the "Selector PLMN List."

At step 206b, after receiving the ATTACH request message, the first network entity 200b may be configured to send an ATTACH reject message with #14 cause to the UE 200a. The ATTACH reject message with #14 cause indicates the UE 200a that the PS service is not supported by the first network entity 200b. Further, the CS service is supported by the first network entity 200b.

At step 208b, after receiving the ATTACH reject message with #14 cause, the UE 200a may be configured to avoid the triggering of PLMN selection to remain camped on the first network entity 200b for the CS service. For example, the PLMN selection is blocked and remains registered on the PLMN for the CS service by considering the "Selector PLMN List."

At step 210b, the UE 200a avoids the PLMN selection and remains camped on the first network entity 200b for the CS service, thus avoiding CS paging miss, out of service problems, call drops, or the like.

Unlike conventional systems and methods, the UE 200a considers the "Selector PLMN List" for handling of #14 reject cause when the SIM does not contain the "User Preferred" and the "Operator Preferred" PLMN list. Further, by considering the "Selector PLMN List," the UE 200a will remain registered for the CS services. Thus, the CS paging miss, the out of service problems, the call drops, or the like may be avoided.

The steps in the sequence diagram of FIG. 2B may be performed in the order presented, in a different order or simultaneously. Further, some of the steps may be omitted, added, modified, skipped, or the like without departing from the scope and spirit of the present disclosure.

Figure 2C:
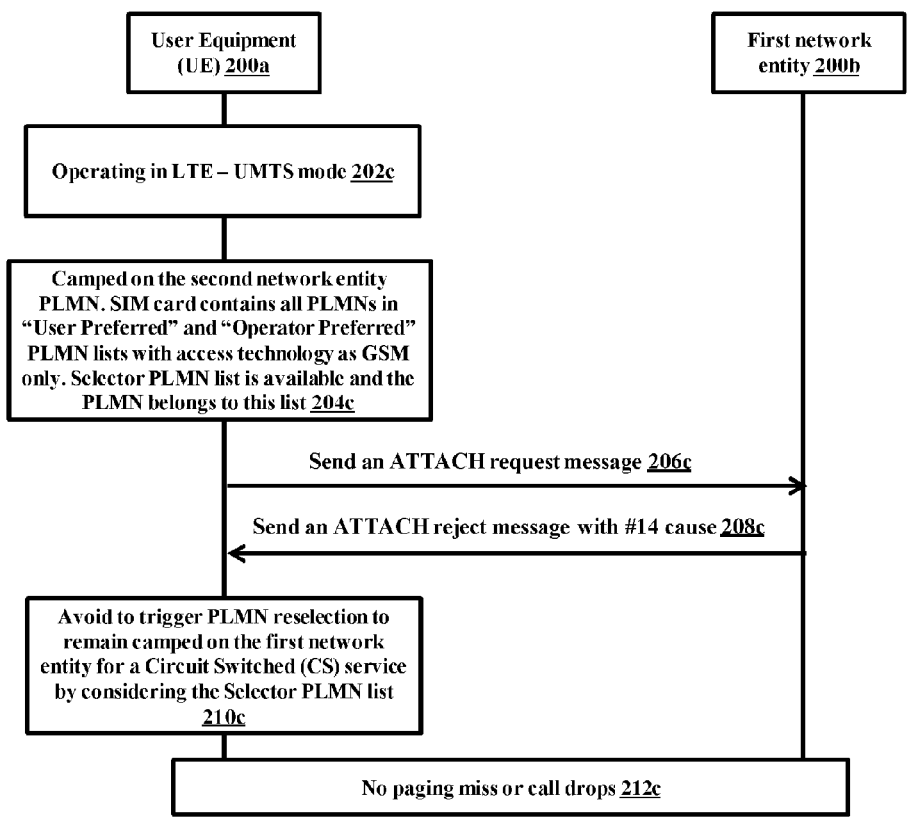
FIG. 2C is a sequence diagram for handling an ATTACH reject message with #14 cause to remain camped on a network entity for a CS service, according to an embodiment of the present disclosure.

FIG. 2C is a sequence diagram for handling an ATTACH reject message with #14 cause to remain camped on a network entity for the CS service, according to an embodiment of the present disclosure.

Referring to FIG. 2C, the signaling sequence depicts communication between the UE 200a, and the first network entity 200b (i.e., a network entity). The first network entity 200b may be the UMTS network.

At step 202c, the UE 200a is operating in LTE-UMTS mode.

At step 204c, the UE 200a is camped on the PLMN of the first network entity 200b. A SIM card in the UE 200a contains a "User Preferred" PLMN list and an "Operator Preferred" PLMN list with an access technology as the GSM only. Further, the SIM card includes the "Selector PLMN List," and the PLMN is in the "Selector PLMN List."

At step 206c, the UE 200a may be configured to send an ATTACH request message for the network service (i.e., the CS service and the PS service) on the PLMN to the first network entity 200b, where the PLMN is in the "Selector PLMN List."

At step 208c, after receiving the ATTACH request message, the first network entity 200b sends an ATTACH reject message with #14 cause to the UE 200a. The ATTACH reject message with #14 cause indicates that the PS service is not supported by the first network entity 200b.

At step 210c, after receiving the ATTACH reject message with #14 cause, the UE 200a may be configured to avoid the triggering of the PLMN selection to remain camped on the first network entity 200b for the CS service. In an example, the PLMN selection is blocked and remains registered on the PLMN for the CS service by considering the "Selector PLMN List."

At step 212c, the UE 200a blocks the PLMN selection and remains registered on the PLMN for the CS service, thus avoiding CS paging miss, out of service problems, call drops, or the like.

The steps in the sequence diagram of FIG. 2C may be performed in the order presented, in a different order or simultaneously. Further, some of the steps may be omitted, added, modified, skipped, or the like without departing from the scope and spirit of the present disclosure.

Figure 3:
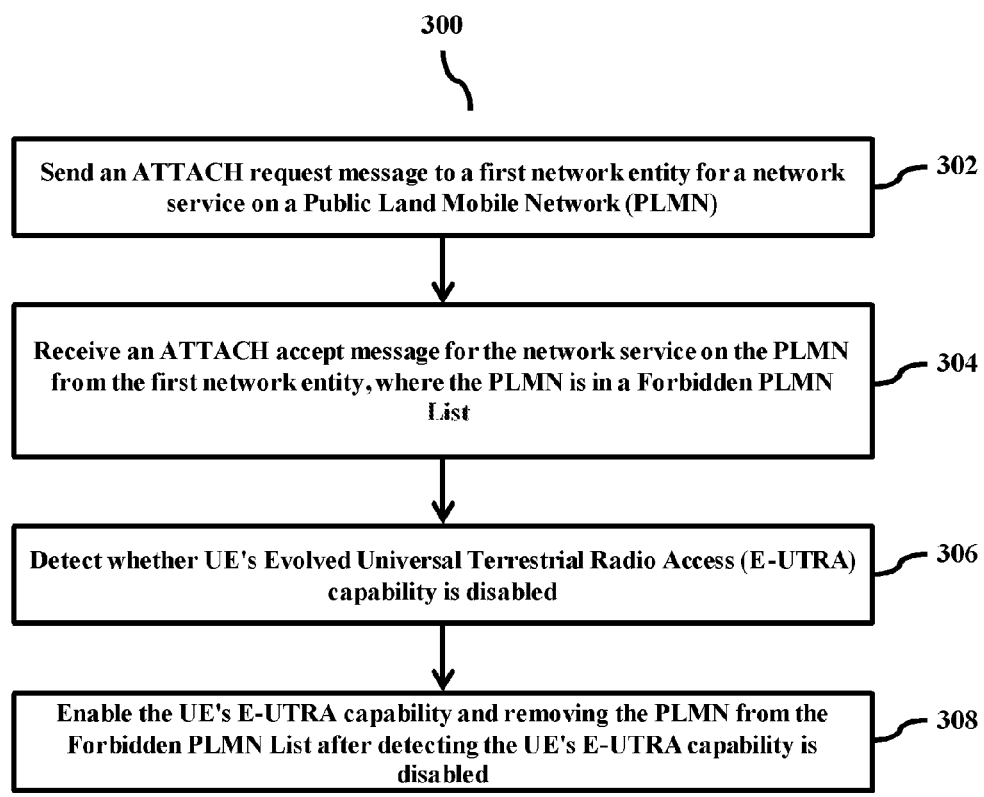
FIG. 3 is a flowchart of a method for handling an ATTACH reject message with #14 cause by enabling an E-UTRA of a UE, according to an embodiment of the present disclosure.

FIG. 3 is a flowchart of a method 300 for handling an ATTACH reject message with #14 cause by enabling an E-UTRA of the UE 200a, according to an embodiment of the present disclosure.

Referring to FIG. 3, at step 302, the method 300 includes sending an ATTACH request message to the first network entity 200b for the network service on the PLMN. The method 300 allows the UE 200a to send the ATTACH request message to the first network entity 200b for the network service on the PLMN.

At step 304, the method 300 includes receiving an ATTACH accept message for the network service on the PLMN from the first network entity 200b. The method 300 allows the UE 200a to receive the ATTACH accept message for the network service on the PLMN from the first network entity 200b. The PLMN is in the "Forbidden PLMNs for GPRS service" list. The ATTACH accept message for the network service on the PLMN from the first network entity 200b is received when the manual PLMN selection is triggered at the UE 200a. The PLMN is added to the "Forbidden PLMNs for GPRS service" list and the corresponding UE's 200a E-UTRA capability is disabled after receiving the ATTACH reject message with #14 cause from the second network entity 200c.

At step 306, the method 300 includes detecting the UE's 200a E-UTRA capability is disabled. The method 300 allows the UE 200a to detect the UE's E-UTRA capability is disabled.

At step 308, the method 300 includes enabling the UE's 200a E-UTRA capability and removing the PLMN from the "Forbidden PLMNs for GPRS service" list. The method 300 allows the UE 200a to enable the E-UTRA capability and remove the PLMN from the "Forbidden PLMNs for GPRS service" list. Unlike conventional systems and methods, the E-UTRA of the UE 200a is enabled when the PS service registration is accepted through the manual selection of the PLMN in the "Forbidden PLMNs for GPRS service" list. Further, no service and CS paging miss can be avoided, thus, providing a better user experience by providing uninterrupted service.

The various actions, acts, blocks, steps, or the like in the method 300 may be performed in the order presented, in a different order or simultaneously. Further, some of the actions, acts, blocks, steps, or the like may be omitted, added, modified, skipped, or the like without departing from the scope and spirit of the present disclosure.

Figure 4:
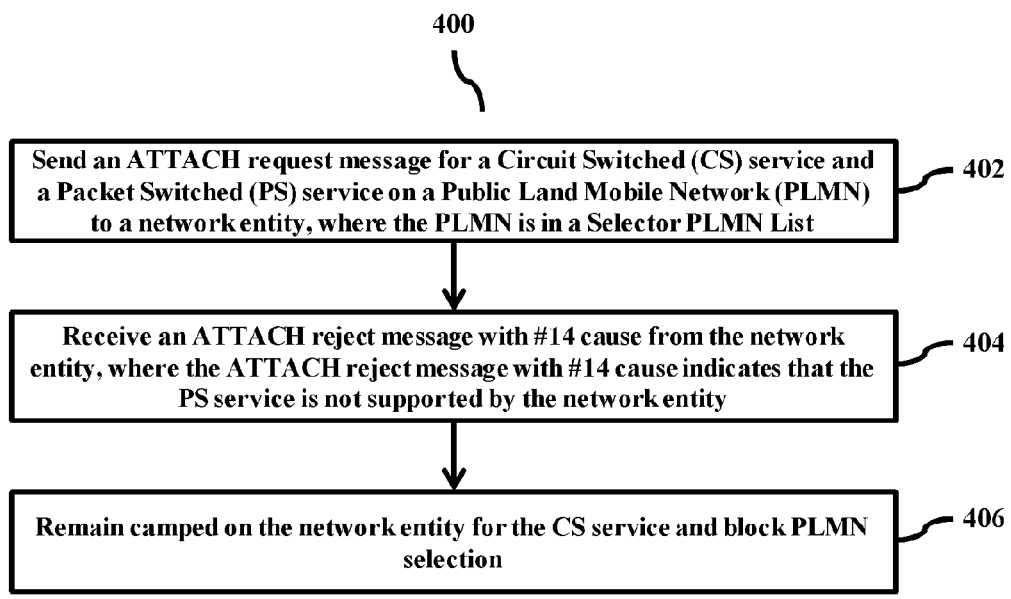
FIG. 4 is a flowchart of a method for handling an ATTACH reject message with #14 cause at a UE, according to an embodiment of the present disclosure.

FIG. 4 is a flowchart of a method 400 for handling an ATTACH reject message with #14 cause at the UE 200a, according to an embodiment of the present disclosure.

Referring to FIG. 4, at step 402, the method 400 includes sending an ATTACH request message for the CS service and the PS service on the PLMN to the first network entity 200b (i.e., network entity), where the PLMN is in the "Selector PLMN List." The method 400 allows the UE 200a to send the ATTACH request message for the CS service and the PS service on the PLMN to the first network entity 200b (i.e., network entity), where the PLMN is in the "Selector PLMN List."

At step 404, the method 400 includes receiving an ATTACH reject message with #14 cause from the first network entity 200b, where the ATTACH reject message with #14 cause indicates that the PS service is not supported by the first network entity 200b. The method 400 allows the UE 200a to receive the ATTACH reject message with #14 cause from the first network entity 200b, where the ATTACH reject message with #14 cause indicates that the PS service is not supported by the first network entity 200b.

At step 406, the method 400 includes remaining camped on the first network entity 200b for the CS service. The method 400 allows the UE 200a to remain camped on the first network entity 200b for the CS service and block the PLMN selection. The UE 200a avoids the PLMN selection by remaining camped on the first network entity 200b for the CS service.

In an embodiment of the present disclosure, the "User Preferred PLMN List" and the "Operator PLMN List" are available in the SIM card of the UE 200a. In an embodiment, the "User Preferred PLMN List" and the "Operator PLMN List" are unavailable in the SIM of the UE 200a.

The various actions, acts, blocks, steps, or the like in the method 400 may be performed in the order presented, in a different order or simultaneously. Further, some of the actions, acts, blocks, steps, or the like may be omitted, added, modified, skipped, or the like without departing from the scope and spirit of the present disclosure.

Figure 5:
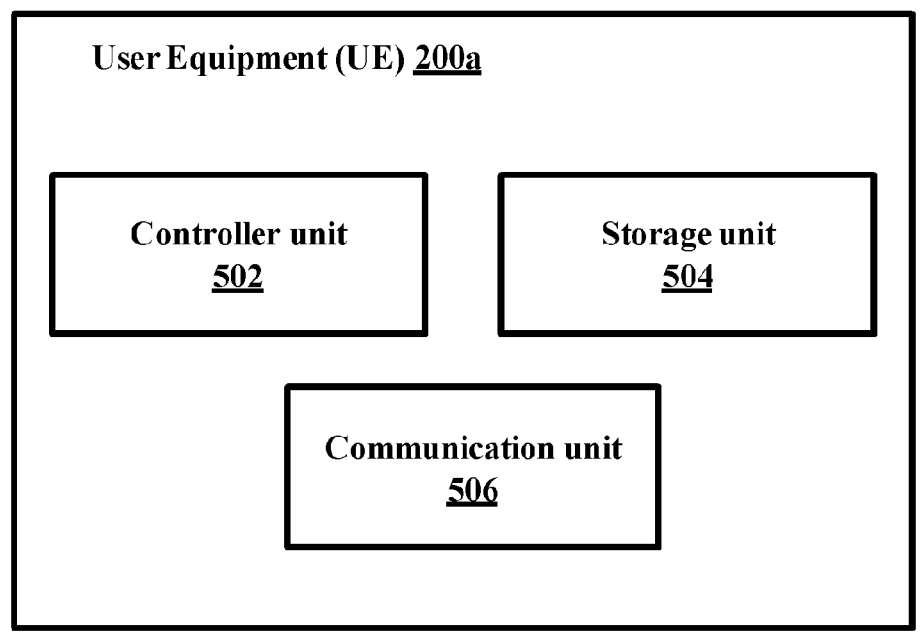
FIG. 5 is a block diagram of a UE, according to an embodiment of the present disclosure.

FIG. 5 is a block diagram of the UE 200a, according to an embodiment of the present disclosure.

Referring to FIG. 5, the UE 200a includes a controller unit 502, a storage unit 504, and a communication unit 506.

In an embodiment of the present disclosure, the controller unit 502 may be configured to receive an ATTACH accept message for a network service on a PLMN from the first network entity 200b, where the PLMN is in a "Forbidden PLMNs for GPRS service" list and the UE's 200a E-UTRA capability is disabled. The ATTACH accept message for the network service on the PLMN from the first network entity 200b is received when a manual PLMN selection is triggered at the UE 200a. Further, the controller unit 502 may be configured to enable the UE's 200a E-UTRA capability and removing the PLMN from the "Forbidden PLMNs for GPRS service" list.

In an embodiment of the present disclosure, the controller unit 502 may be configured to receive an ATTACH accept message for the network service on the PLMN from the first network entity 200b by sending an ATTACH request message to the first network entity 200b for the network service on the PLMN. Further, the controller unit 502 may be configured to receive an ATTACH accept message from the first network entity 200b. The PLMN may be added in the "Forbidden PLMNs for GPRS service" list, and the corresponding UE's 200a E-UTRA capability is enabled in response to receiving an ATTACH reject message with #14 cause from the second network entity 200c.

In an embodiment of the present disclosure, the controller unit 502 may be configured to send an ATTACH request message for a CS service and a PS service on a PLMN to the first network entity 200b, where the PLMN is in the "Selector PLMN List." Further, the controller unit 502 may be configured to receive an ATTACH reject message with #14 cause from the first network entity 200b, where an ATTACH reject message with #14 cause indicates that the PS service is not supported by the first network entity 200b. Further, the controller unit 502 may be configured to avoid triggering of a PLMN selection to remain camped on the first network entity 200b for a CS service. The "User Preferred PLMN List" and the "Operator PLMN List" may be available in a SIM card of the UE 200a. The "User Preferred PLMN List" and the "Operator PLMN List" may be unavailable in the SIM card of the UE 200a.

The storage unit 504 may include one or more non-transitory computer-readable storage media. The storage unit 504 may include non-volatile storage elements. Non-volatile storage elements may include magnetic hard discs, optical discs, floppy discs, flash memories, or forms of electrically programmable read only memories (EPROMs) or electrically erasable and programmable ROMs (EEPROMs). In addition, the storage unit 504 may, in some examples, be considered a non-transitory storage medium. The term "non-transitory" may indicate that the storage medium is not embodied in a carrier wave or a propagated signal. However, the term "non-transitory" is not intended to be interpreted that the storage unit 504 is non-movable. The storage unit 504 may be configured to store larger amounts of information than the memory. A non-transitory computer-readable storage medium may store data that may, over time, change (e.g., in random access memory (RAM) or cache memory). The communication unit 506 may be configured to communicate internally between the units of FIG. 5 and externally with networks.

FIG. 5 shows various units of the UE 200a, but embodiments of the present disclosure are not limited thereon. The UE 200a may include less or more units. Further, the labels or names of the units are used only for illustrative purpose but are not intended to limit the scope and spirit of the present disclosure. One or more units of FIG. 5 may be combined to perform the same or substantially similar functions in the UE 200a.

Figure 6:
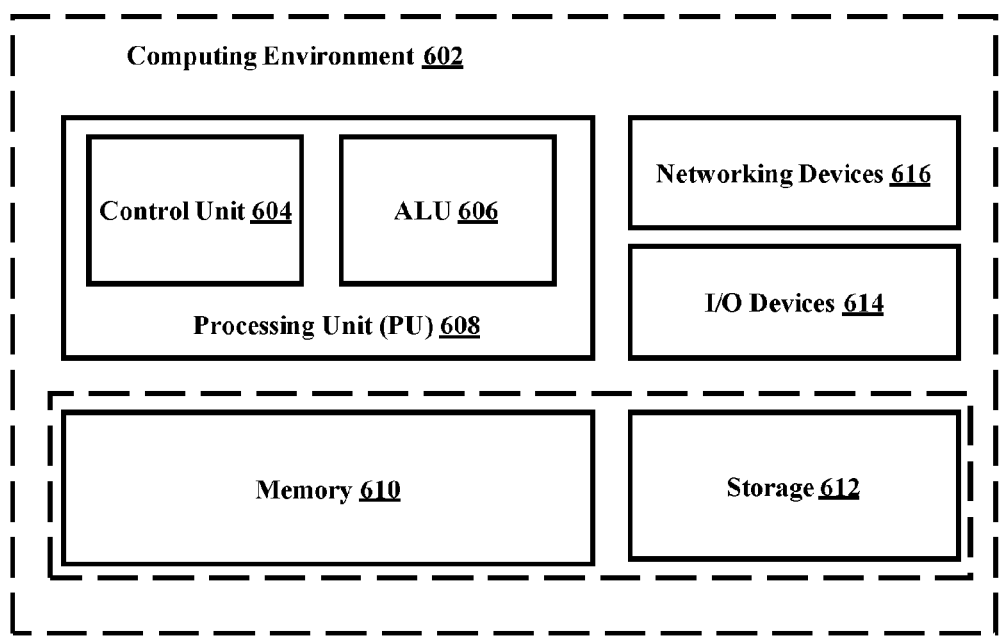
FIG. 6 is a block diagram of a computing environment for handling an ATTACH reject message with #14 cause at a UE, according to an embodiment of the present disclosure.

FIG. 6 is a block diagram of a computing environment for handling an ATTACH reject message with #14 cause at the UE 200a, according to an embodiment of the present disclosure.

Referring to FIG. 6, the computing environment 602 includes at least one processing unit 608 that is equipped with a control unit 604 and an arithmetic logic unit (ALU) 606, a memory 610, a storage unit 612, a plurality of networking devices 616 and a plurality of input and output (I/O) devices 614. The at least one processing unit 608 is responsible for processing the instructions of the schemes. The at least one processing unit 608 receives commands from the control unit 604 in order to perform processing. Further, any logical and arithmetic operations involved in the execution of the instructions are computed with assistance of the ALU 606.

The computing environment 602 may be composed of multiple homogeneous or heterogeneous cores, multiple central processing units (CPUs) of different kinds, special media and other accelerators. The processing unit 608 is responsible for processing instructions of the schemes. Further, the at least one processing unit 608 may be located on a single integrated circuit (IC) or over multiple ICs.

A scheme including instructions and code required for its implementation are stored in either the memory 610 or the storage 612 or both. At the time of execution, the instructions may be fetched from the corresponding memory 610 or storage 612, and executed by the at least one processing unit 608.

In case of a hardware implementation, the plurality of networking devices 616 or the I/O devices 614 may be connected to the computing environment 602 to support the hardware implementation through the plurality of networking devices 616 and the I/O devices 612.

The embodiments of the present disclosure disclosed herein may be implemented through at least one software program running on at least one hardware device and may perform network management functions to control the elements. The elements shown in FIGS. 2A through 6 include blocks which may be at least one hardware device or a combination of a hardware device and software units.

The foregoing description of the present disclosure will so fully reveal the general nature of the embodiments herein that others may, by applying current knowledge, readily modify or adapt for various applications such embodiments without departing from the scope and spirit of the present disclosure, and, therefore, such adaptations and modifications are intended to be within the scope of the present disclosure. It is intended that the phraseology or terminology employed herein is for the purpose of description and not of limitation. Therefore, while the embodiments herein have been described, those skilled in the art will recognize that the embodiments herein may be practiced with modification within the scope of the present disclosure as defined by the appended claims and their equivalents.

What is claimed is:

1. A method for handling an ATTACH reject message with packet radio service mobility management reject cause number 14 (#14 cause) at a user equipment (UE), the method comprising:
   receiving, at the UE, an ATTACH accept message for a network service on a public land mobile network (PLMN) from a first network entity if a non-access stratum (NAS) timer is expired, wherein the PLMN is in a "forbidden PLMNs for general packet radio service (GPRS) service" list;
   detecting, by the UE, that the UE's evolved universal terrestrial radio access (E-UTRA) capability is disabled; and
   enabling, by the UE, the UE's E-UTRA capability and removing the PLMN from the "forbidden PLMNs for GPRS service" list.

2. The method of claim 1, further comprising receiving the ATTACH accept message for the network service on the PLMN from the first network entity if a manual PLMN selection is triggered at the UE.

3. The method of claim 1, wherein receiving, at the UE, the ATTACH accept message for the network service on the PLMN from the first network entity comprises:
   sending an ATTACH request message to the first network entity for the network service on the PLMN; and
   receiving the ATTACH accept message from the first network entity.

4. The method of claim 1, further comprising adding the PLMN to the "forbidden PLMNs for GPRS service" list and disabling the corresponding UE's E-UTRA capability in response to receiving the ATTACH reject message with #14 cause from a second network entity.

5. A method for handling an ATTACH reject message with packet radio service mobility management reject cause number 14 (#14 cause) at a user equipment (UE), the method comprising:
   sending, by the UE, an ATTACH request message for a circuit switched (CS) service and a packet switched (PS) service on a public land mobile network (PLMN) to a network entity, wherein the PLMN is in a "selector PLMN" list;
   receiving, by the UE, an ATTACH reject message with #14 cause from the network entity; and remaining, by the UE, camped on the network entity for the CS service and blocking PLMN selection when a "user preferred PLMN" list and an "operator PLMN" list are unavailable in a subscriber identity module (SIM) of the UE.

6. The method of claim 5, further comprising blocking, by the UE, the PLMN selection when a "user preferred PLMN" list and an "operator PLMN" list are available in a subscriber identity module (SIM) of the UE, wherein the PLMN in the "user preferred PLMN" list and the "operator PLMN" list are available in the SIM supporting an access network different than an access network currently operating at the UE.

7. A user equipment (UE) for handling an ATTACH reject message with packet radio service mobility management reject cause number 14 (#14 cause), comprising:
a controller configured to:
receive an ATTACH accept message for a network service on a public land mobile (PLMN) from a first network entity if a non-access stratum (NAS) timer is expired, wherein the PLMN is in a "forbidden PLMNs for general packet radio service (GPRS) service" list;
detect that the UE's evolved universal terrestrial radio access (E-UTRA) capability is disabled; and
enable the UE's E-UTRA capability and remove the PLMN from the "forbidden PLMNs for GPRS service" list.

8. The UE of claim 7, wherein the controller is further configured to receive the ATTACH accept message for the network service on the PLMN from the first network entity if a manual PLMN selection is triggered at the UE.

9. The UE of claim 7, wherein the controller is further configured to receive the ATTACH accept message for the network service on the PLMN from the first network entity by:
sending an ATTACH request message to the first network entity for the network service on the PLMN; and
receiving the ATTACH accept message from the first network entity.

10. The UE of claim 7, wherein the controller is further configured to add the PLMN to the "forbidden PLMNs for GPRS service" list and disable the corresponding UE's E-UTRA in response to receiving the ATTACH reject message with #14 cause from a second network entity.

11. A user-equipment (UE) for handling an ATTACH reject message with packet radio service mobility management reject cause number 14 (#14 cause), comprising:
a controller configured to:
send an ATTACH request message for a circuit switched (CS) service and a packet switched (PS) service on a public land mobile (PLMN) to a network entity, wherein the PLMN is in a "selector PLMN" list;
receive an ATTACH reject message with #14 cause from the network entity; and
remain camped on the network entity for the CS service and block PLMN selection if a "user preferred PLMN" list and an "operator PLMN" list are unavailable in a subscriber identity module (SIM) of the UE.

12. The UE of claim 11, wherein the controller is further configured to block the PLMN selection if a "user preferred PLMN" list and an "operator PLMN" list are available in a subscriber identity module (SIM) of the UE, wherein the PLMN in the "user preferred PLMN" list and the "operator PLMN" list are available in the SIM supporting an access network different than an access network currently operating at the UE.

13. A non-transitory computer-readable storage medium having recorded thereon a computer program for executing a method of:
receiving, at a user equipment (UE), an ATTACH accept message for a network service on a public land mobile network (PLMN) from a first network entity if a non-access stratum (NAS) timer is expired, wherein the PLMN is in a "forbidden PLMNs for general packet radio service (GPRS)" list;
detecting, by the UE, that the UE's evolved universal terrestrial radio access (E-UTRA) capability is disabled; and
enabling, by the UE, the UE's E-UTRA capability and removing the PLMN from the "forbidden PLMNs for GPRS service" list.

14. A non-transitory computer-readable storage medium, having recorded thereon a computer program for executing a method of:
sending, by a user equipment (UE), an ATTACH request message for a circuit switched (CS) service and a packet switched (PS) service on a public land mobile network (PLMN) to a network entity, wherein the PLMN is in a "selector PLMN" list;
receiving, by the UE, an ATTACH reject message with general packet radio service (GPRS) mobility management (GMM) reject cause number 14 (#14 cause) from the network entity; and
remaining, by the UE, camped on the network entity for the CS service and blocking PLMN selection when a "user preferred PLMN" list and an "operator PLMN" list are unavailable in a subscriber identity module (SIM) of the UE.

* * * * *